(12) United States Patent
Horvath et al.

(10) Patent No.: US 8,514,237 B2
(45) Date of Patent: Aug. 20, 2013

(54) TWO DIMENSIONAL MEMORY CACHING APPARATUS FOR HIGH DEFINITION VIDEO

(75) Inventors: Thomas A. Horvath, Stormville, NY (US); Brent Paulovicks, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1512 days.

(21) Appl. No.: 11/752,017

(22) Filed: May 22, 2007

(65) Prior Publication Data

US 2008/0292276 A1    Nov. 27, 2008

(51) Int. Cl.
*G09G 5/36* (2006.01)
(52) U.S. Cl.
USPC .......................................................... 345/557
(58) Field of Classification Search
USPC .......................................................... 345/557
See application file for complete search history.

(56) References Cited

U.S. PATENT DOCUMENTS

| | | | | |
|---|---|---|---|---|
| 6,262,748 | B1 * | 7/2001 | Deering et al. | 345/519 |
| 6,289,138 | B1 * | 9/2001 | Yip et al. | 382/307 |
| 6,549,210 | B1 * | 4/2003 | Van Hook et al. | 345/561 |
| 6,591,347 | B2 * | 7/2003 | Tischler et al. | 711/134 |
| 6,825,848 | B1 * | 11/2004 | Fu et al. | 345/557 |
| 2006/0050786 | A1 * | 3/2006 | Tanizawa et al. | 375/240.03 |
| 2006/0050976 | A1 * | 3/2006 | Molloy | 382/233 |
| 2008/0282038 | A1 * | 11/2008 | Sethuraman et al. | 711/134 |

FOREIGN PATENT DOCUMENTS

WO   WO 2005104027 A2 * 11/2005

* cited by examiner

*Primary Examiner* — Edward Martello
(74) *Attorney, Agent, or Firm* — F. Chau & Associates, LLC; Daniel P. Morris, Esq.

(57) ABSTRACT

A computer readable medium is provided embodying instructions executable by a processor to perform a method for caching video data in a two-dimensional cache. The method includes storing the video data in the two-dimensional cache, addressing stored video data in the two-dimensional cache using a first tag for referencing video data of a first dimension, addressing the stored video data in the cache in terms of a second tag for referencing video data of a second dimension, and retrieving and outputting a portion of the stored video data from the two-dimensional cache according to one of the first tag and the second tag.

13 Claims, 3 Drawing Sheets

| Frame Addr. | | | Row Address | | | | | | | | | | Pixel Address | | | | | | | | | | | |
|---|---|---|---|---|---|---|---|---|---|---|---|---|---|---|---|---|---|---|---|---|---|---|---|---|
| 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |

```
                    |← Vert. →|                        |← Line →|
                    |  Block  |                        |  Size  |
|   First Tag       | Set Index  |  Second Tag  | Line Byte Address |
|        101        |    102     |      103     |        104        |
                                 |←    Horizontal Resolution      →|
|←              Maximum Memory Address Range                     →|
```

| Tag | | | | | | | | | Set Index | | | | Tag | | | Line Byte Address | | | | | | |
|---|---|---|---|---|---|---|---|---|---|---|---|---|---|---|---|---|---|---|---|---|---|---|
| 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |

| Video Resolution | Vertical Resolution | Horizontal Resolution | Maximum Number of Reference Frames | Maximum Memory Address Range |
|---|---|---|---|---|
| 1920 x 1080 (HD) | 2K = 11 bits | 2K = 11 bits | 5 frames = 3 bits | 25 bits (32MB) |
| 1280 x 720 (HD) | 2K = 11 bits | 1K = 10 bits | 5 frames = 3 bits | 24 bits (16MB) |
| 720 x 480 (SD) | 1K = 10 bits | 512 = 9 bits | 5 frames = 3 bits | 22 bits (4MB) |

TWO DIMENSIONAL MEMORY CACHING APPARATUS FOR HIGH DEFINITION VIDEO

BACKGROUND

1. Technical Field

The present disclosure relates to memory caching and, more specifically, to a two-dimensional memory caching apparatus for high definition video.

2. Description of Related Art

A cache is a collection of data that has been copied from an original source where the original source is more expensive to fetch from, for example, in terms of access time or data traffic, than the location of the cache. The term cache may also refer to the memory device that is used to store the collection of data.

A microprocessor such as a central processing unit (CPU) of a computer, a specialized processor such as a video signal processor or any other host device may use a cache to increase processing performance by avoiding having to fetch data from a more expensive source, such as main memory. The cache may be stored in high-speed memory that is highly integrated with the processor. For example, the cache may be stored on the same chip as the processor. In other configurations, a cache may be embodied in a discrete memory component that is faster and/or more accessible than the main memory.

The cache may store a set of entries where each entry is populated with data fetched from main memory. Each entry may also include a tag. The tag represents the location that the data was copied from in the original source. When the processor desires to read data, the processor may first look to the cache. If the desired data is found in the cache (a cache hit), then a reading from the main memory may foe saved. Because relatively expensive high-speed storage is often used as a cache, the amount of available storage in the cache is typically lower than the total amount of data stored in main memory. For this reason, typically, only a small part of the main memory data is copied to the cache at a given time. When the processor cannot find the desired data in the cache (cache miss), the processor must fetch the desired data directly from the main memory.

There are multiple ways in which a cache can be organized. In a fully associative cache, data of main memory may be stored in any cache entry. While a fully associative cache has the flexibility to store any data at any available entry, all cached entries must be checked for the desired data before fetching from main memory. Another example, is a directly mapped cache, which has only one possible entry for a given range of data in main memory. Accordingly, only one location in the cache needs to be checked when attempting to read data from the cache. However, the directly mapped cache lacks the flexibility to accommodate multiple units of data from the same range of main memory. Therefore, even a relatively empty cache may not he able to store additional data without overwriting existing data if that data happens to come from the same range of main memory.

A set associative cache is organized as a compromise between the directly mapped cache and the fully associative cache. In the set associative cache, any particular location in main memory may be cached in one of a limited number of entries. The set associative cache is named according to this limited number. For example, in a 2-way set associative cache, a particular location in main memory may be cached to one of two possible locations, while in a 4-way set associative cache, there would he four possible locations.

The ability of a cache to speed up the operation of the processor and/or to lessen data traffic is dictated by the ability to provide cache hits rather than cache misses. Increasing the size of the cache is one way of increasing the rate of cache hits (hit rate). However, this approach often results in increased manufacturing costs for the device incorporating the cache.

The growing popularity of high-definition video processing has placed increased demands on the computing power of processors associated with high definition video encoding and/or decoding. This is in part the result of a video processing step known as motion compensation. In motion compensation, a picture element, for example a block of pixels, is described in terms of its relation to a similar block of pixels that may be above, below, to the left, or to the right of the block or in a previous frame. By defining the picture element in this way, less data is necessary to represent the same picture. Motion compensation involves high amounts of memory traffic resulting in both significant memory bandwidth and increased power requirements. This is especially true of high definition video processors using the H.264 video compression standard. Moreover, high definition video decoders must achieve high performance at a low cost in order to be commercially successful. However, conventional cache systems may not be adequate to meet the needs of high definition video encoding and/or decoding while minimizing the cost of manufacture.

SUMMARY

According to an embodiment of the present disclosure, a computer readable medium is provided embodying instructions executable by a processor to perform a method for caching video data in a two-dimensional cache. The method includes storing the video data in the two-dimensional cache, addressing stored video data in the two-dimensional cache using a first tag for referencing video data of a first dimension, addressing the stored video data in the cache in terms of a second tag for referencing video data of a second dimension, and retrieving and outputting a portion of the stored video data from the two-dimensional cache according to one of the first tag and the second tag.

According to an embodiment of the present disclosure, a two-dimensional cache for storing video data that has been decompressed from an H.264 video compression standard includes a plurality of sets for storing tags of cached video data comprising a first tag for referencing video data of a first dimension and a second tag for referencing video data of a second dimension, a plurality of banks for storing the cached video data of the first and second dimensions, a plurality of comparators for identifying cache hits, and a bank select for retrieving the cached video data.

According to an embodiment of the present disclosure, a computer system includes a processor, and a program storage device readable by the computer system, embodying a program of instructions executable by the processor to perform method steps for caching video data. The method including storing the video data in a cache, wherein the data has been decompressed using a H.264 video compression standard, addressing stored video data in the cache in terms of a first tag for referencing video data of a first dimension, and addressing the stored video data in the cache in terms of a second tag for referencing video data of a second dimension.

BRIEF DESCRIPTION OF THE DRAWINGS

Preferred embodiments of the present disclosure will be described below in more detail, with reference to the accompanying drawings.

DETAILED DESCRIPTION OF EXEMPLARY EMBODIMENTS

Figures 1, 2A, 2B:
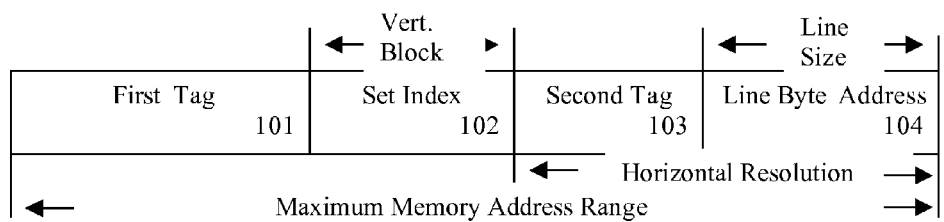
FIG. 1 is an HD image map for a 1920×1080 image.
FIG. 2A is a block diagram showing at two-dimensional cache address map according to an exemplary embodiment of the present invention.
FIG. 2B is an exemplary diagram of a two-dimensional cache address map for a 24 bit implementation according to an embodiment of the present disclosure.

In describing preferred embodiments of the present disclosure illustrated in the drawings, specific terminology is employed for sate of clarity. However, the present disclosure is not intended to be limited to the specific terminology so selected, and it is to he understood that each specific element includes all technical equivalents which operate in a similar manner.

H.264, also known as MPEG-4 Part 10 or Advanced Video Coding (AVC), is a digital video codec standard that is capable of achieving a high level of compression for high definition (HD) video content. In accordance with the concept of motion compensation discussed above, each image of video content that is compressed according to the H.264 standard is broken up into a set of blocks of data known as macroblocks. In encoding each macroblock, adjacent image frames within a region known as a search window may be called upon to find a best possible match of a current macroblock. By encoding a macroblock in relation to a best possible match, less data may need to foe encoded to accurately describe the macroblock. In decoding the encoded macroblock, the decoder may be passed a pointer for locating the best match macroblock so that the data needed to decode the macroblock may be found. The decoder therefore may be asked to reference a best match macroblock that may be located anywhere within the two-dimensional search window of the macroblock being decoded.

The search window for a given macroblock being decoded includes macroblocks that are proximate in two-dimensions, i.e., to the left, to the right, above and below the given macroblock. The search window may also include proximate macroblocks in previous image frames. As the search window may be heavily accessed during a decoding operation, it is desirable to store as much of the search window as possible within the cache. Because conventional memory caches store data linearly in one dimension, rows of macroblocks with large images, such as high definition images, may end up being cached in separate banks of a set associative cache structure or not cached at all. Therefore, a conventional memory cache may have difficulty storing the data associated with the two-dimensional search window of the macroblock being decoded without requiring a large and expensive amount of cache memory.

Embodiments of the present invention exploit the fact that in H.264 compressed video, rows within a block of data are separated by fixed distances. Memory addresses may be parsed according to this fixed distance within a two-dimensional memory cache such that macroblocks that are proximate to the macroblock being decoded in two dimensions may have a high probability of being cached, even if the overall size of the cache remains relatively small.

According to one exemplary embodiment of the present invention, ail of the reference macroblocks within the search window may be stored within the main memory and may occupy 32 MB of space. The data within the 32 MB of main memory may be addressed by unique 25-bit addresses. Here, a 4-way set-associative cache may be used, for example, with a 128 byte line size and 16 lines per block. Such a cache may provide a flexible means for caching multiple blocks from either multiple pages or different locations within the same page. This cache design is chosen as an illustrative example and it is to be understood that the layout of the cache may change to accommodate the specific nature of the video signal being processed.

As discussed above, the video image, for example a high definition video image of 1920×1080 resolution may occupy 32 MB in main memory. The image data may be laid out in memory such that each row may be rounded up to the nearest $2^n$ bytes. The video memory may be identified by a unique 25-bit address. This address may include a three-bit frame address, an 11-bit row address and an 11-bit pixel address as seen in FIG. 1.

The data stored in the cache may be referenced with a 25-bit address that includes a first tag, for example having 10-bits, a set index, for example having 4-bits, a second tag, for example having 4-bits, and a line address, for example having 7-bits as seen in FIG. 2B.

The separation of the tag bits into a first tag and a second tag allows the cache to have an X-axis dimension and a Y-axis dimension with fixed properties for specific data types, such as video image data. The second tag value in conjunction with the line byte address represents the x-axis dimension data. The first tag value in conjunction with the Set Index represents the y-axis dimension. The size of each tag field is dependent upon the image size. If the image is relatively small and the cache is relatively large, then the size of the set index field may increase and the second tag may he decreased to as few as zero bits. However, as the image size is increased and the cache size is kept relatively small then the Second Tag field may be increased proportionally to the horizontal size of the image. By separating the horizontal and vertical components of the address, the cache achieves a two-dimensional character.

Figures 3, 4:
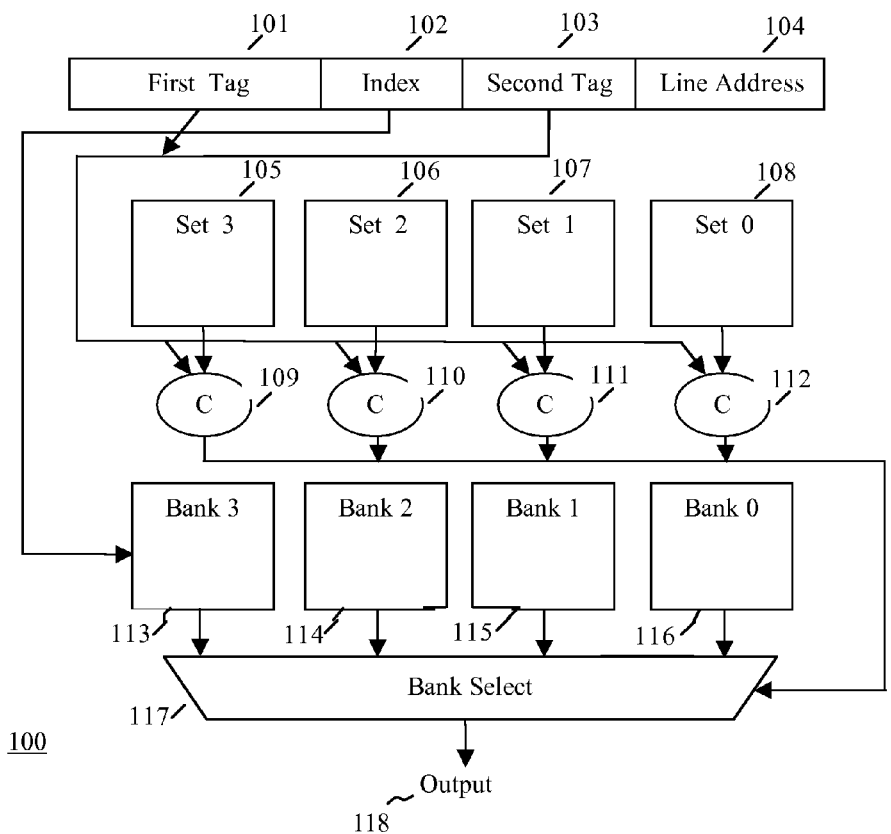
FIG. 3 is a block diagram showing a memory cache according to an exemplary embodiment of the present invention.
FIG. 4 is table of two-dimensional cache address parameters for various video resolutions according to an embodiment of the present disclosure.

FIG. 3 is a block diagram showing a memory cache and method thereof according to an exemplary embodiment of the present invention. The memory cache 100 includes four-sets, herein referred to as set 3 105, set 2 106, set 1 107, and set 0 108. Each set represents a set of the 4-way set associative cache selected as an example embodiment. Each set 105-108 is in contact with a respective comparator 109-112. Cache entries may have, for example, a 25-bit address. The address may include a first tag 101 section that may be, for example, 10-bits, an index 102 section that may be, for example, 4-bits, a second tag 103 section that may be, for example, 4-bits and a line byte address 104 section that may be, for example, 7-bits. The first tag 101 and the second tag 103 may be sent to each comparator 109-112. Each comparator 109-112 may compare the first tag 101 and second tag 103 against data stored in its corresponding set 105-108 so that a cache hit may be identified. The index 102 may be connected to a set of memory banks identified as bank 3 113, bank 2 114, bank 1 115 and bank 0 116. Each bank 113-116 corresponds to a set 105-108. The comparators 109-112 and the banks 113-116 may all be connected to a bank select 117 so that the bank select 117 can know when there has been a cache hit and can retrieve the desired data, e.g., for output to a display or video data processing hardware 118, from the correct bank in the event of a cache hit.

FIG. 2A is a block diagram showing a two-dimensional cache address map according to an exemplary embodiment of the present invention. The size of each field 101-104 is determined based on the resolution of the video being cached as well as architectural preferences representing factors such as system constraints and cost constraints.

The line byte address 104 represents a line size that is based on the number of bytes per cache line. This value may be, for example, 32 to 128 bytes of data, which would use an address size of from 5 to 7 bits. The set index 102 represents a vertical block. This value may be based on the number of lines per block to be cached. For example, there may be 16 lines per block which would use an address size of 4-bits. The second tag 103 and the line byte address 104 together represent a horizontal resolution. The size of this address may be based upon the video resolution. FIG. 4 below shows examples of the memory and address requirements for various video resolutions. The first tag 101, the set index 102, the second tag 103 and the line byte address 104 together represent the maximums memory address range. The maximum memory range may be based upon the video resolution. FIG. 4 also shows examples of maximum memory ranges for various video resolutions.

In FIG. 4, HD indicates a high-definition resolution while SD indicates a standard-definition resolution. To calculate the number of bits used to address memory in the cache, the following equations may be used:

Line Byte Address=Line Size

Set Index=Vertical Block

First Tag=Maximum Memory Address Range−(Vertical Block Size+Horizontal Resolution)

Second Tag=Horizontal Resolution−Line Size

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 5:
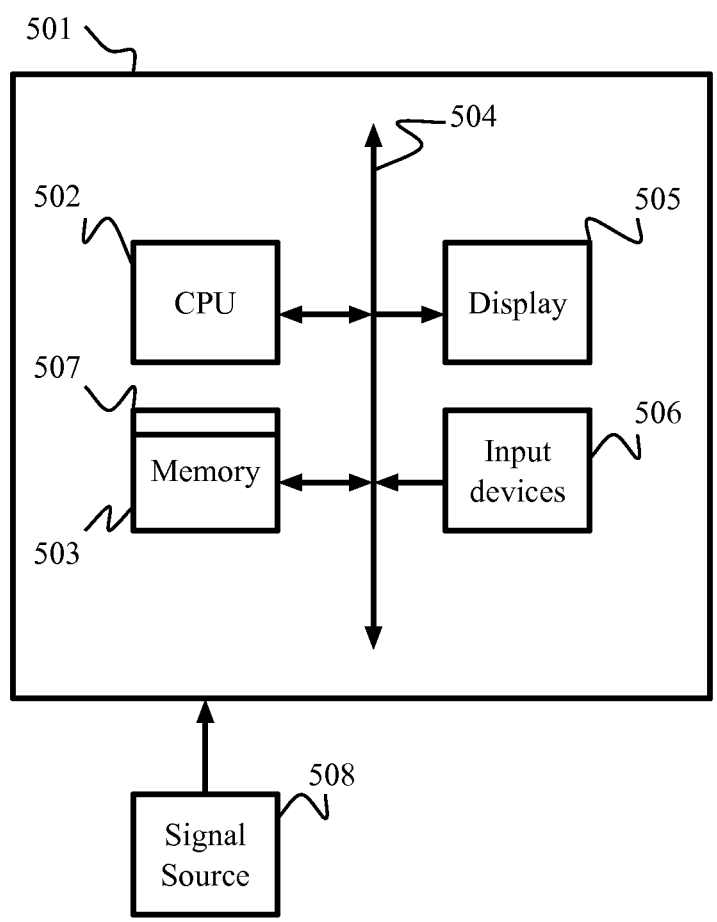
FIG. 5 shows an example of a computer system capable of implementing the method and apparatus according to embodiments of the present disclosure.

Referring to FIG. 5, according to an embodiment of the present invention, a computer system 501 for two-dimensional memory caching for video data can comprise, inter alia, a central processing unit (CPU) 502, a memory 503 and an input/output (I/O) interface 504. The computer system 501 is generally coupled through the I/O interface 504 to a display 505, e.g., for display of the video data, and various input devices 506 such as a mouse and keyboard. The support circuits can include circuits such as cache, power supplies, clock circuits, and a communications bus. The memory 503 can include random access memory (RAM), read only memory (ROM), disk drive, tape drive, or a combination thereof. The present invention can be implemented as a routine 507 that is stored in memory 503 and executed by the CPU 502 to process the signal from the signal source 508. As such, the computer system 501 is a general-purpose computer system that becomes a specific-purpose computer system when executing the routine 507 of the present invention.

The computer platform 501 also includes an operating system and micro instruction code. The various processes and functions described herein may either be part of the micro instruction code, or part of the application program (or a combination thereof) which is executed via the operating system. In addition, various other peripheral devices may be connected to the computer platform such as an additional data storage device and a printing device.

It is to foe further understood that, because some of the constituent system components and methods depicted in the accompanying figures may foe implemented in software, the actual connections between the system components (or the processes) may differ depending upon the manner in which the present invention is programmed. Given the teachings of the present invention provided herein, one of ordinary skill in the related art will be able to contemplate these and similar implementations or configurations of the present invention.

Having described embodiments for a system and method for two-dimensional memory caching for video data, it is noted that modifications and variations can be made by persons skilled in the art in light of the above teachings. It is therefore to be understood that changes may be made in the particular embodiments of the invention disclosed which are within the scope and spirit of the disclosure.

What is claimed is:

1. A non-transitory computer-readable media embodying instructions executed by a processor to perform a method for caching video data in a two-dimensional cache, the method comprising:
    storing the video data in a plurality of banks of the two-dimensional cache having a y-axis component and an x-axis component;
    controlling a bank select to retrieve a portion of the stored video data from the plurality of banks of the two-dimensional cache according to a comparison of a first tag and a second tag of an address to a plurality of tags stored in a set associative cache comprising a plurality of sets corresponding to the plurality of banks, respectively,
    wherein the plurality of tags correspond to the video data stored in the plurality of banks,
    the first tag of the address for referencing a first dimension of the two-dimensional cache corresponding to the y-axis component, and the second tag of the address for referencing a second dimension of the two-dimensional cache corresponding to the x-axis component; and
    outputting the portion of the stored video data from the two-dimensional cache according to the comparison,
    wherein a field size of the first tag and a field size of the second tag vary depending upon a resolution of the video data.

2. The non-transitory computer-readable media of claim 1, wherein the video data is parsed according to the vertical and horizontal resolution of the video data.

3. The non-transitory computer-readable media of claim 1, wherein the address is a 25-bit address, the 25-bit address comprising:
    the first tag of 10-bits;
    a set index of 4-bits;
    the second tag of 4-bits; and
    a line byte address of 7-bits.

4. The non-transitory computer-readable media of claim 1, wherein the field size of the second tag is set proportionally to the horizontal resolution of the video data.

5. The non-transitory computer-readable media of claim 1, wherein the video data is addressed by the address comprising:
    the first tag;
    a set index;
    the second tag; and
    a line byte address.

6. The non-transitory computer-readable media of claim 5, wherein a value of the second tag in conjunction with a value of the line byte address represents the x-axis component of the video data and a value of the first tag in conjunction with a value of the set index represents the y-axis component of the video data.

7. A two-dimensional cache for storing video data that has been decompressed from an H.264 video compression standard, comprising:
- a plurality of two-dimensional addresses for storing tags of cached video data, each two-dimensional address comprising a first tag for referencing video data of a first dimension and a second tag for referencing video data of a second dimension;
- a plurality of banks for storing the cached video data of the first and second dimensions;
- a plurality of comparators for identifying cache bits of the cached video data stored in a plurality of sets corresponding to the plurality of banks, respectively, according to the first tag and the second tag; and
- a bank select for retrieving the cached video data,
- wherein a field size of the first tag and a field size of the second tag vary depending upon a resolution of the video data.

8. The cache of claim 7, wherein the cache is a set-associative cache.

9. The cache of claim 7, wherein the cache is a 4-way set-associative cache.

10. The cache of claim 7, wherein the video data is parsed according to the vertical and horizontal resolution of the video data.

11. The cache of claim 7, wherein each two-dimensional address comprises:
- the first tag;
- a set index;
- the second tag; and
- a line byte address.

12. The cache of claim 7, wherein a value of the second tag in conjunction with a value of the line byte address represents an x-axis of the video data and a value of the first tag in conjunction with a value of the set index represents a y-axis of the video data.

13. The cache of claim 7, wherein the field size of the second tag is set proportionally to the horizontal resolution of the video data.

\* \* \* \* \*